United States Patent [19]

Tupper

[11] Patent Number: 5,115,837
[45] Date of Patent: May 26, 1992

[54] BALL FUEL VALVE WITH RESERVE POSITION

[76] Inventor: Willis E. Tupper, 11865 Durston Dr., Pinckney, Mich. 48169

[21] Appl. No.: 766,614

[22] Filed: Sep. 25, 1991

[51] Int. Cl.$^5$ ............................................. F16K 11/87
[52] U.S. Cl. .............................. 137/625.41; 137/590; 137/544; 251/144
[58] Field of Search ................... 137/625.41, 590, 544, 137/545; 251/144

[56] References Cited

U.S. PATENT DOCUMENTS

| 1,050,181 | 1/1913 | Turner. |  |
|---|---|---|---|
| 1,132,833 | 3/1915 | Coseo. |  |
| 1,364,497 | 1/1921 | Weir. |  |
| 1,462,217 | 7/1923 | Stalder. |  |
| 4,250,921 | 2/1981 | Pingel et al. | 137/625.41 |
| 4,890,644 | 1/1990 | Hoeptner | 137/625.41 |

*Primary Examiner*—Arnold Rosenthal
*Attorney, Agent, or Firm*—Krass & Young

[57] ABSTRACT

A fuel valve for use in the fuel system of motorized recreational vehicle, such as a motorcycle, snowmobile, or the like. The improved fuel valve generally includes a valve body, main and reserve inlet tubes attached to the valve body, a valve assembly disposed within the valve body, and a plurality of gaskets adapted to seal the valve assembly within the valve body. The valve assembly is adapted to rotate through open, reserve and closed positions to provide various fuel settings.

7 Claims, 3 Drawing Sheets

BALL FUEL VALVE WITH RESERVE POSITION

FIELD OF THE INVENTION

The present invention relates to fuel selector valves for fuel storage tanks, and more particularly to fuel selector valves for motor vehicle fuel tanks.

BACKGROUND OF THE INVENTION

The operators of vehicles, such as motorcycles, snowmobiles, and other recreational vehicles, typically have various specific needs for flexibility in the fuel systems of their vehicles.

One such need is to provide the means for maintaining a reserve supply of fuel. It is known to incorporate a reserve valve in the fuel delivery line to provide for access to a reserve supply of fuel. Typically, the main fuel inlet for such a reserve valve is located at a point somewhat above the bottom of the fuel tank, while a reserve fuel inlet is located in closer proximity to the bottom of the fuel tank. Thus, a single fuel tank, located on the motor vehicle, provides both the main and reserve supplies of the fuel for the vehicle. The reserve supply of fuel corresponds to the fuel located in the bottom portion of the fuel tank.

Such reserve valves have incorporated a rotatable disk or a tapered valve body having a passageway selectably rotatable into cooperative position with one or more inlets and an outlet in the reserve valve. See for example: U.S. Pat. Nos. 1,364,497 and 1,462,217. Alternatively, the reserve valves include a concentric, rotatable valve having multiple vertically spaced inlet ports as a mechanism to selectively connect various inlets with an outlet therein. See for example: U.S. Pat. No. 4,250,921.

There are numerous problems associated with the prior art reserve valves, however. The disk and tapered plug types of reserve valves have surface structures which are difficult to seal properly. These valves require suitably placed gaskets having a large bearing surface area to prevent leakage. Such large bearing surfaces wear quickly, eventually resulting in leaks in the valve itself. These large surfaces, associated especially with the tapered plug type, are prone to failure resulting from contamination on the surfaces thereof. Thus, these types of valves are limited by inherent significant maintenance requirements. Further, the concentric type of reserve valve requires precise machining which is inherently costly to assemble and manufacture.

Another such need is to provide the means for reliably shutting off the flow of fuel between the fuel storage tank and the internal combustion engine. It is known to provide on-off ball valves in the fuel delivery line for such control over the flow of fuel. These on-off valves provide a means to shut off the fuel supply to prevent the loss of fuel by malfunction or accidental fuel spills, and occasionally to prevent the theft of the motor vehicle itself by preventing the engine from starting.

The present invention overcomes the problems associated with the prior art by providing an inexpensive, relatively maintenance-free, reserve valve which has the capability of providing both reserve fuel and shut off features.

SUMMARY OF THE INVENTION

The present invention provides an improved fuel valve adapted for use in the fuel system of a motor vehicle. The improved fuel valve generally includes a valve body, main and reserve inlet tubes attached to the valve body, a valve assembly disposed within the valve body, and a plurality of gaskets adapted to seal the valve assembly within the valve body.

The valve body defines an internal valve chamber and a substantially planar attachment face adapted to bear against the exterior of the fuel tank of a motor vehicle, such as a motor cycle or other recreational vehicle, to allow insertion of the inlet tubes into the fuel tank. The valve body engages suitable connector devices, such as threaded posts extending from the fuel tank, to secure the valve in place. Further, a registration pin extending from the fuel tank may be utilized to further align the valve.

The valve includes main and reserve inlets and an outlet adapted to communicate with the internal valve chamber. The main fuel inlet and the reserve fuel inlet both communicate with the internal valve chamber open outwardly onto the attachment face. The fuel outlet; however, opens outwardly at a location apart from the attachment face.

The substantially cylindrical nylon main inlet tube attaches at one end to the valve body in communication with the main fuel inlet so as to extend substantially perpendicularly away from the attachment face of the valve body. The opposite end of the main inlet tube has an inlet screen disposed thereon to prevent foreign matter from entering the fuel valve.

The substantially cylindrical nylon reserve inlet tube attaches at one end to the valve body in communication with the reserve fuel inlet so as to extend substantially perpendicularly away from the attachment face of the valve body and substantially parallel to the main inlet tube. The opposite end of the reserve inlet tube has an inlet screen disposed thereon. The length of the reserve inlet tube is no more than half the length of the main inlet tube to provide for a measurable amount of reserve fuel capacity in the fuel tank.

The valve assembly operatively engages the valve body and includes an externally positionable handle element and a ball element attached to the handle element and operatively disposed within the internal valve chamber. The ball valve element has a plurality of interconnected internal passageways which terminate into at least three openings on the surface of the ball element. These openings are disposed so that, when the handle element is disposed in a first open position, the main fuel inlet and fuel outlet are operationally interconnected through the internal passageways of the ball element to allow for the flow of fuel through the fuel valve. When the handle element is disposed in a second reserve position, the reserve fuel inlet and fuel outlet are operationally interconnected through the internal passageways of the ball element to allow for the flow of reserve fuel through the fuel valve. When the handle element is disposed in a third closed position, the fuel outlet is operationally isolated from the passageways to prevent the flow of fuel through the fuel valve.

Preferably, the plurality of internal passageways in the ball element include a pair of passageways. A first substantially cylindrical, internal passageway is oriented to pass through the center of the ball element and open onto the surface of the ball element at both ends thereof. This configuration provides a pair of openings on opposite sides of the ball element. Further, the main fuel inlet of the valve body opens into the internal valve chamber opposite the point where the fuel outlet opens into the internal valve chamber so that, when the handle element is disposed in the first open position, the first passageway of the ball element operationally interconnects the main fuel inlet and the fuel outlet to provide a direct path for fuel therethrough.

A second substantially cylindrical, internal passageway is oriented to pass through the center of the ball element and open onto the surface of the ball element at one end thereof. The second passageway is further oriented so as to substantially form a right angle with the first passageway. The reserve fuel inlet of the valve body opens into the internal valve chamber between the points where the main fuel inlet and the fuel outlet open into the internal valve chamber so that, when the handle element is disposed in the second reserve position, the second passageway of the ball element operationally interconnects the reserve fuel inlet to the first internal passageway.

A plurality of valve gaskets are disposed within the internal valve chamber to seal the ball element within the internal valve chamber. The plurality of valve gaskets includes a first gasket disposed to seal the interconnection between the ball element and the main fuel inlet. A second gasket is disposed to seal the interconnection between the ball element and the reserve fuel inlet, and a third gasket disposed to seal the interconnection between the ball element and the fuel outlet. These gaskets do not experience the excessive wear associated with the prior art due to the nature of the ball element and gasket interface.

Preferably, the ball element further includes a pair of outwardly projecting posts axially aligned with respect to one another along an axis through the center of the ball element. This axis is substantially perpendicular to the first and second pathways. One of the posts is further adapted to project outwardly from the valve body and engage the handle element. In this embodiment, the internal cavity of the valve body is further configured to receive the ball element for rotation about the axis when the handle element is moved between the first open position, the second reserve position, and the third closed position.

BRIEF DESCRIPTION OF THE DRAWINGS

These and other objects and aspects of the invention will become apparent in the detailed description of the invention hereinafter with respect to the drawings in which.

DETAILED DESCRIPTION OF THE PREFERRED EMBODIMENT

Figure 1:
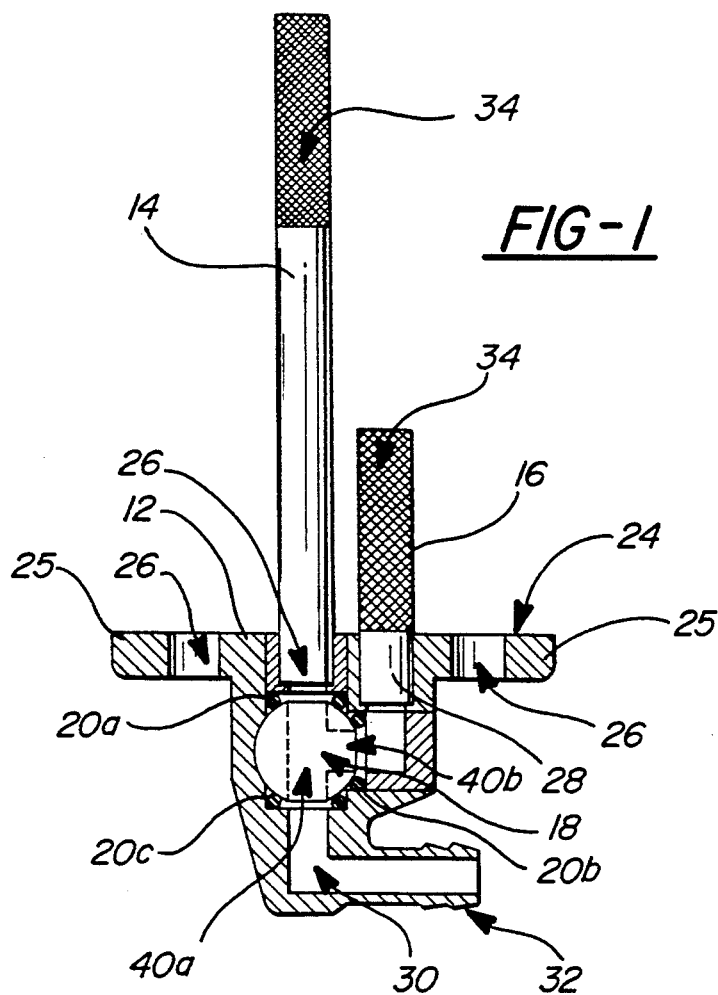
FIG. 1 is a front cutaway view of the invention fuel selector valve.
Figure 2:
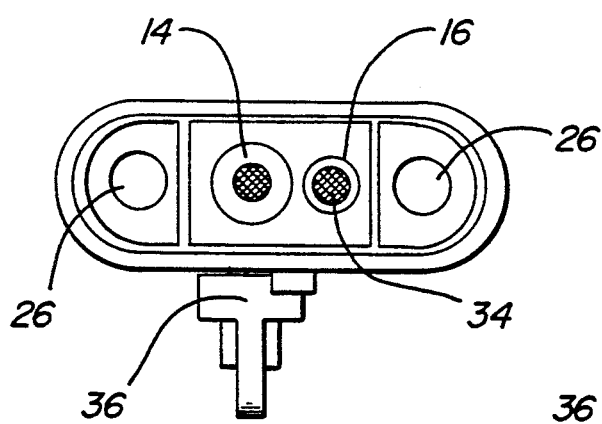
FIG. 2 is a top view of the invention fuel selector valve.
Figure 3:
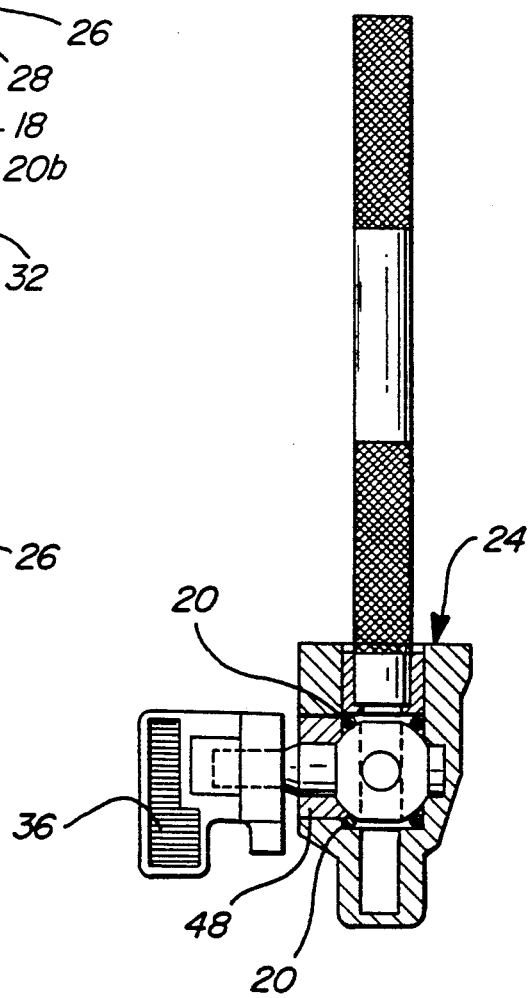
FIG. 3 is a side cutaway view of the invention fuel selector valve.

With reference to FIGS. 1-5, the present improved fuel valve is adapted for use in the fuel system of a motorized recreational vehicle. Using a motorcycle as an example, the improved fuel valve generally includes a valve body 12, substantially cylindrical nylon main 14 and reserve 16 inlet tubes attached to the valve body, a valve assembly 18 disposed within the valve body, and a plurality of gaskets 20 adapted to seal the valve assembly 18 within the valve body 12. The valve body 12 can be secured to the exterior of the fuel tank 13 of the motorcycle by operation of suitable connector devices, such as nuts 15 engaging threaded posts 17 extending from the fuel tank 13, to secure the valve in place. Further, a registration pin 19 extending from the fuel tank may be utilized to further align the valve.

More specifically, the valve body 12 defines an internal valve chamber 22 and is further configured to provide a substantially planar attachment face 24 adapted to bear against the exterior surface of the fuel tank 13. Flanges 25 associated with the planar attachment face 24 have openings 26 adapted to engage threaded posts 17 and/or registration pins 19 extending from the fuel tank to secure the valve in place.

Figure 5A:
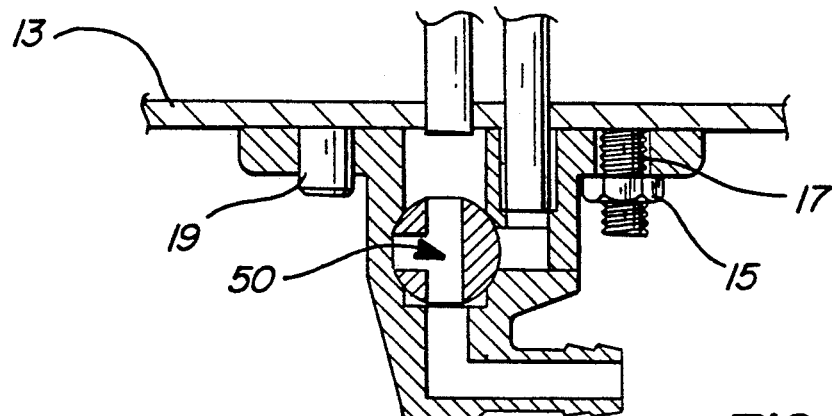
FIG. 5 is a three-section diagram of the fuel selection positions of the invention fuel selector valve.
Figure 5B:
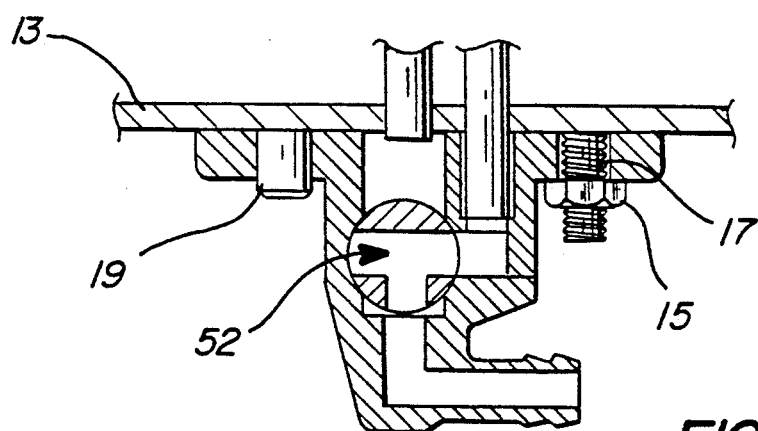
Figure 5C:
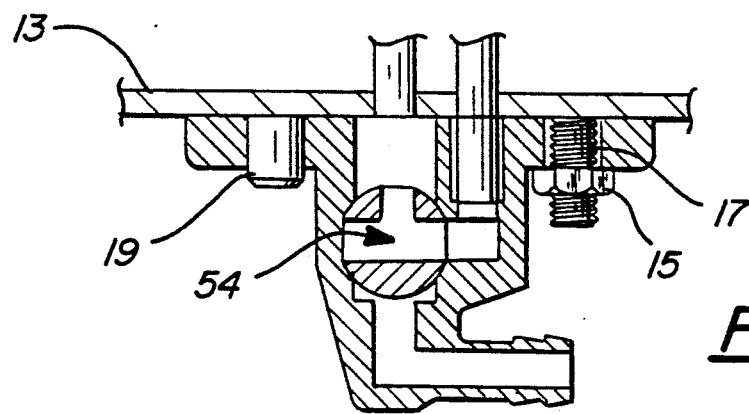

With reference specifically to FIGS. 1 and 5, a plurality of channels in the valve body communicate with the internal chamber 22. A main fuel inlet 26 extends between the internal valve chamber 22 and the attachment face 24. A reserve fuel inlet 28 extends between the valve chamber 22 and the attachment face 24. A fuel outlet 30 extends between valve chamber 22 and an outwardly projecting outlet nozzle 32. The main fuel inlet 26 of the valve body opens into the internal valve chamber 22 opposite the point where the fuel outlet 30 opens into the internal valve chamber. Thus, the main fuel inlet 26 and the outlet 30 open into the chamber 23 at substantially opposite sides thereof, while the reserve fuel inlet 28 opens at a point generally midway therebetween.

The main inlet tube 14 attaches at one end to the valve body 12 in communication with the main fuel inlet 26 and extends substantially perpendicularly away from the attachment face 24. The opposite end of the main inlet tube provides the main inlet opening for the valve and has an inlet screen 34 disposed thereon to prevent foreign matter from entering the fuel valve. The reserve inlet tube 16 attaches at one end to the valve body 12 in communication with the reserve fuel inlet 28 and extends substantially perpendicularly away from the attachment face 24 spaced apart from and substantially parallel to the main inlet tube 14. The opposite end of the reserve inlet tube provides the reserve inlet opening for the valve and also has an inlet screen 34 disposed thereon.

The inlet tubes project substantially perpendicularly away from the planar face 24 so as to be inserted into the fuel tank when the valve is in place. The length of the reserve inlet tube 16 is preferably no more than half the length of the main inlet tube 14 to provide for a measurable amount of reserve fuel capacity in the fuel tank 13. By way of example, the main inlet tube 14 is preferably 6.75 inches long and the reserve inlet tube 16 is 2.25 inches long. Thus, the reserve fuel is stored in the bottom 4.5 inches of the fuel tank 13 below the open end of the main inlet tube 14.

Figure 4:
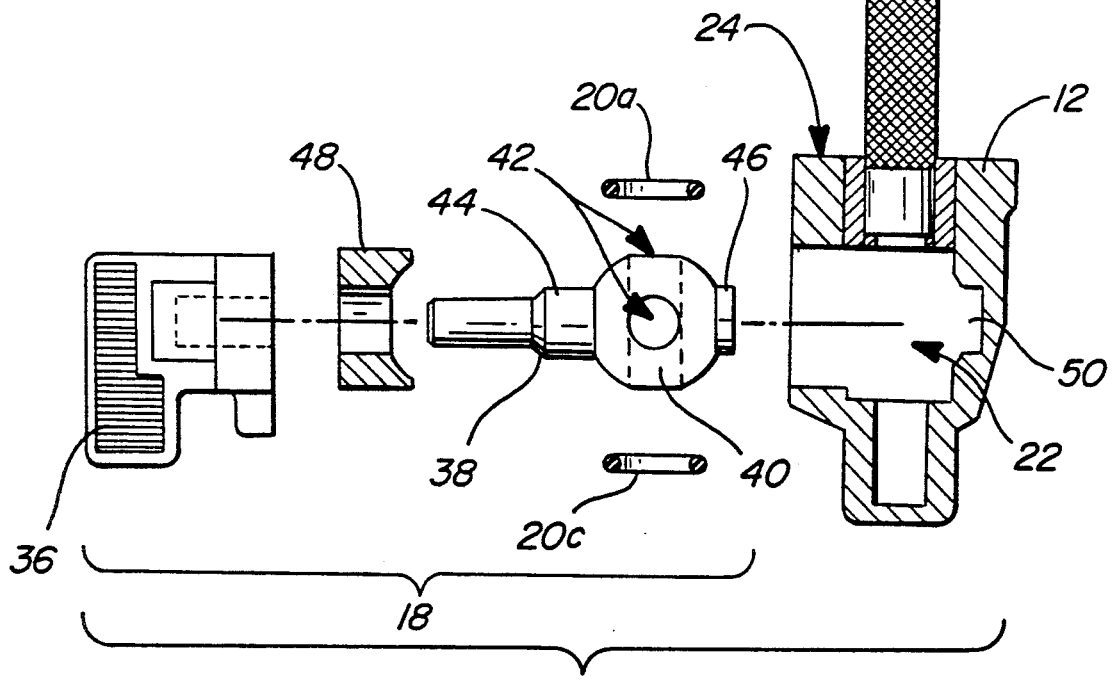
FIG. 4 is an exploded side view of the invention fuel selector valve.

With reference specifically to FIGS. 4 and 5, the valve assembly 18 is operatively disposed within the valve chamber 22 and includes an externally positionable handle element 36 and a ball element 38. The ball valve element 38 has a plurality of interconnected internal passageways 40 which terminate into three discrete openings 42 on the surface of the ball element. These openings 42 are disposed at 90° intervals about the surface of the ball element 38.

The plurality of internal passageways 40 in the ball element include a first substantially cylindrical, internal passageway 40A oriented to pass through the center of the ball element. This passageway 40A opens onto the surface of the ball element at both ends thereof approximately 180° opposite each other on the surface of the ball element to provide a pair of openings on opposite sides of the ball element.

A second substantially cylindrical, internal passageway 40B is oriented to pass through the center of the ball element so as to extend substantially perpendicularly to the first passageway 40A and open onto the surface of the ball element at one end thereof. Since, the second passageway is oriented to substantially form a right angle with the first passageway, the second passageway opens on the surface of the ball element midway between the openings associated with the first passageway 40A (i.e., at 90° intervals in an arc about the surface of the ball element).

The ball element 38 further includes a pair of outwardly projecting posts 44,46 axially aligned with respect to one another along an axis through the center of the ball element. This axis is substantially perpendicular to the first and second pathways so as to align the internal passageways 40 radially about the post axis. One of the posts 44 is adapted to project outwardly from the valve body through a removable positioning cap 48 to engage the handle element 36 and the internal cavity of the valve body is configured to include a recess 50 adapted to receive the other post 46. In this manner, the posts 44,46 are supported by cap 48 and recess 50 so that the valve assembly 18 may rotate about the post axis.

A plurality of valve gaskets 20 are disposed within the internal valve chamber to seal the ball element within said internal valve chamber. The plurality of valve gaskets includes a first gasket 20A disposed to seal the interconnection between the ball element 38 and the main fuel inlet 30. A second gasket 20B is disposed to seal the interconnection between the ball element 38 and the reserve fuel inlet, and a third gasket 20C disposed to seal the interconnection between the ball element 38 and the fuel outlet 30.

With reference specifically to FIG. 5, when the handle element 36 is rotated to dispose the ball element in a first (open) position 50, the main fuel inlet and fuel outlet are operationally interconnected through the first internal passageway 40A of the ball element to allow for the flow of fuel through the fuel valve. In that position, the reserve inlet 28 is not connected via the internal passageways. When the handle element is rotated to a second (reserve) position 52, the reserve fuel inlet and fuel outlet are operationally interconnected through the internal passageways 40A, 40B of the ball element to allow for the flow of reserve fuel through the fuel valve. When the handle element is disposed in a third (closed) position 54, the fuel outlet is operationally isolated from the passageways to prevent the flow of fuel through the fuel valve.

From the foregoing description of the preferred embodiment it can be seen that various alternative embodiments of the invention can be anticipated without departure from the scope of the invention as defined in the following claims.

I now claim:

1. A fuel valve adapted for use with the fuel tank of a motor vehicle, comprising:

a valve body defining an internal valve chamber, a substantially planar attachment face adapted to be secured to the exterior of the fuel tank, a main fuel inlet communicating with said internal valve chamber and oriented so as to open on said substantially planar attachment face, a reserve fuel inlet communicating with said internal valve chamber and oriented so as to open on said substantially planar attachment face, and a fuel outlet communicating with said internal valve chamber;

a substantially cylindrical nylon main inlet tube having one end attached to said valve body in communication with said main fuel inlet so as to extend substantially perpendicularly away from said substantially planar attachment face of said valve body, the opposite end of said main inlet tube having an inlet screen disposed thereon;

a substantially cylindrical nylon reserve inlet tube having one end attached to said valve body in communication with said reserve fuel inlet so as to extend substantially perpendicularly away from said substantially planar attachment face of said valve body and substantially parallel to said main inlet tube, the length of said reserve inlet tube being no more than half the length of said main inlet tube, and the opposite end of said reserve inlet tube having an inlet screen disposed thereon;

a valve assembly operatively engaging said valve body, said valve assembly including an externally positionable handle element and a ball element operatively disposed within said internal valve chamber and attached to said handle element, said ball valve element having a plurality of interconnected internal passageways which terminate into at least three openings on the surface thereof, said at least three openings being disposed so that when said handle element is disposed in a first open position said main fuel inlet and fuel outlet are operationally interconnected through said internal passageways of said ball element to allow for the flow of fuel through the fuel valve, in a second reserve position said reserve fuel inlet and fuel outlet are operationally interconnected through said internal passageways of said ball element to allow for the flow of reserve fuel through the fuel valve, and in a third closed position said fuel outlet is operationally isolated from said passageways to prevent the flow of fuel through the fuel valve; and a plurality of valve gaskets operatively disposed within said internal valve chamber to seal the ball element within said internal valve chamber, said plurality of valve gaskets including a first gasket disposed to seal the interconnection between said ball element and said main fuel inlet, a second gasket disposed to seal the interconnection between said ball element and said reserve fuel inlet, and a third gasket disposed to seal the interconnection between said ball element and said fuel outlet.

2. The valve of claim 1, wherein said ball element includes a first substantially cylindrical, internal passageway oriented to pass through the center of the ball element and open onto the surface of the ball element at both ends thereof.

3. The valve of claim 2, wherein said main fuel inlet of said valve body opens into said internal valve chamber opposite the point where said fuel outlet opens into said internal valve chamber so that when said handle element is disposed in said first open position said first passageway of said ball element operationally interconnects said main fuel inlet and said fuel outlet.

4. The valve of claim 3, wherein said ball element includes a second substantially cylindrical, internal passageway oriented to pass through the center of the ball element and open onto the surface of the ball element at one end thereof, said second passageway being further oriented so as to substantially form a right angle with said first passageway.

5. The valve of claim 4, wherein said reserve fuel inlet of said valve body opens into said internal valve chamber between the points where said main fuel inlet and said fuel outlet open into said internal valve chamber so that when said handle element is disposed in said second reserve position said second passageway of said ball element operationally interconnects said reserve fuel inlet to said first internal passageway.

6. The valve of claim 4, wherein said ball element further includes a pair of outwardly projecting posts axially aligned with respect to one another along an axis through the center of said ball element, said axis being substantially perpendicular to said first and second pathways, one of said posts being further adapted to engage said handle element; and said internal cavity of said valve body further being configured to receive said ball element so as to rotate about said axis when said handle element is moved between said first open position, said second reserve position, and said third closed position.

7. A fuel valve adapted to attach for use with the fuel tank of a motor vehicle, comprising:

a valve body defining an internal valve chamber, a substantially planar attachment face adapted to be secured to the exterior of the fuel tank, a main fuel inlet oriented to open into into said internal valve chamber and further oriented to also open on said substantially planar attachment face, a fuel outlet oriented to open into said internal valve chamber opposite the point where said main fuel inlet opens into said internal valve chamber, and a reserve fuel inlet oriented to open on said substantially planar attachment face and further oriented to open into said internal valve chamber between the points where said main fuel inlet and said fuel outlet open into said internal valve chamber;

a substantially cylindrical nylon main inlet tube having one end attached to said valve body in communication with said main fuel inlet so as to extend substantially perpendicularly away from said substantially planar attachment face of said valve body, the opposite end of said main inlet tube having an inlet screen disposed thereon;

a substantially cylindrical nylon reserve inlet tube having one end attached to said valve body in communication with said reserve fuel inlet so as to extend substantially perpendicularly away from said substantially planar attachment face of said valve body and substantially parallel to said main inlet tube, the length of said reserve inlet tube being no more than half the length of said main inlet tube, and the opposite end of said reserve inlet tube having an inlet screen disposed thereon;

a valve assembly operatively engaging said valve body, said valve assembly including an externally positionable handle element and a ball valve element operatively disposed in said internal valve chamber, said ball element including a first substantially cylindrical, internal passageway oriented to pass through the center of the ball element and open onto the surface of the ball element at both ends thereof, said ball element further including a second substantially cylindrical, internal passageway oriented to pass through the center of the ball element and open onto the surface of the ball element at one end thereof, said second passageway being further oriented so as to substantially form a right angle with said first passageway, said ball element further including a pair of outwardly projecting posts axially aligned with respect to one another along an axis through the center of said ball element, said axis being substantially perpendicular to said first and second pathways, one of said posts being adapted to engage said handle element, said ball element being further adapted to rotate about said axis upon rotation of said handle element so that when said handle element is disposed in a first open position said first passageway of said ball element operationally interconnects said main fuel inlet and said fuel outlet to allow for the flow of fuel through the fuel valve, in a second reserve position said first passageway and said second passageway operationally interconnect said main fuel inlet, reserve fuel inlet, and said fuel outlet to allow for the flow of reserve fuel through the fuel valve, and in a third closed position said fuel outlet is operationally isolated from said first passageway and said second passageway to prevent the flow of fuel through the fuel valve; and a plurality of valve gaskets operatively disposed within said internal valve chamber to seal the ball element within said internal valve chamber, said plurality of valve gaskets including a first gasket disposed to seal the interconnection between said ball element and said main fuel inlet, a second gasket disposed to seal the interconnection between said ball element and said reserve fuel inlet, and a third gasket disposed to seal the interconnection between said ball element and said fuel outlet.

* * * * *